(12) United States Patent
Nowroth

(10) Patent No.: US 10,315,210 B2
(45) Date of Patent: Jun. 11, 2019

(54) PIG SYSTEM

(71) Applicant: Eisenmann SE, Boeblingen (DE)

(72) Inventor: Sven Nowroth, Stuttgart (DE)

(73) Assignee: EISENMANN SE, Boeblingen (DE)

( * ) Notice: Subject to any disclaimer, the term of this patent is extended or adjusted under 35 U.S.C. 154(b) by 0 days.

(21) Appl. No.: 15/521,998

(22) PCT Filed: Oct. 13, 2015

(86) PCT No.: PCT/EP2015/002017
§ 371 (c)(1),
(2) Date: Apr. 26, 2017

(87) PCT Pub. No.: WO2016/066247
PCT Pub. Date: May 6, 2016

(65) Prior Publication Data
US 2017/0312776 A1 Nov. 2, 2017

(30) Foreign Application Priority Data
Oct. 30, 2014 (DE) .................. 10 2014 016 109

(51) Int. Cl.
*B65G 53/52* (2006.01)
*B05B 12/14* (2006.01)
*F16L 55/26* (2006.01)
*B05B 15/18* (2018.01)
*F16L 101/12* (2006.01)
*F16L 101/40* (2006.01)

(52) U.S. Cl.
CPC .......... *B05B 12/1481* (2013.01); *B05B 15/18* (2018.02); *F16L 55/26* (2013.01); *F16L 2101/12* (2013.01); *F16L 2101/40* (2013.01)

(58) Field of Classification Search
CPC .......... B65G 53/525; B65G 2201/0291; B05G 12/1481; F16L 55/26; Y10T 137/0391
USPC ............................ 406/49, 50, 94, 95; 137/13
See application file for complete search history.

(56) References Cited

U.S. PATENT DOCUMENTS

| 3,108,012 A | * | 10/1963 | Curtis | ................. B05C 7/08 118/105 |
| 3,620,236 A | * | 11/1971 | Van Arsdale | ........... F16L 55/46 137/13 |
| 3,906,972 A | * | 9/1975 | Jensen | .................... F17D 1/088 137/13 |

(Continued)

FOREIGN PATENT DOCUMENTS

| DE | 10 2004 037 247 B4 | 4/2006 |
| WO | 2004/009247 A1 | 1/2004 |

*Primary Examiner* — Joseph A Dillon, Jr.
(74) *Attorney, Agent, or Firm* — Schroeder Intellectual Property Law Group, LLC

(57) ABSTRACT

A pig system for transporting liquid or pasty substances two pig stations which are connected to one another by way of a pig line. The pig system includes a number of pigs. Accordingly, the two pig stations have a number of parking positions, to which a controllable media connection is respectively assigned. Appropriate activation of the media connections allows the effect to be achieved that only some of the pigs at a time shuttle back and forth between the two pig stations. Defective pigs or operational pigs that are being kept on standby in this case remain in corresponding parking positions of the two pig stations.

4 Claims, 1 Drawing Sheet

(56) References Cited

U.S. PATENT DOCUMENTS

| | | | | |
|---|---|---|---|---|
| 4,389,143 | A | * | 6/1983 | Nadin .................. B65G 53/525 406/197 |
| 4,507,022 | A | * | 3/1985 | Carney .................. B65G 53/30 406/155 |
| 4,515,503 | A | * | 5/1985 | Snowdon ............. B65G 53/525 406/11 |
| 5,056,962 | A | * | 10/1991 | Morimoto .............. B65G 51/04 406/13 |
| 5,230,842 | A | * | 7/1993 | Munde .................. B08B 9/0553 118/408 |
| 5,240,355 | A | * | 8/1993 | Hudalla ............... B65G 53/525 406/192 |
| 6,386,800 | B1 | * | 5/2002 | van Eyck ............. B65G 53/525 406/14 |
| 6,854,478 | B1 | * | 2/2005 | Zeng .................... B08B 9/0551 137/242 |
| 7,793,676 | B2 | | 9/2010 | Albrecht et al. |
| 7,972,089 | B2 | * | 7/2011 | Auriol ..................... B21J 15/32 406/192 |
| 9,279,533 | B2 | * | 3/2016 | Burns ..................... F16L 55/46 |
| 2006/0000933 | A1 | * | 1/2006 | Duerr .................... B05B 7/1404 239/701 |
| 2006/0048814 | A1 | | 3/2006 | Albrecht et al. |
| 2006/0102650 | A1 | * | 5/2006 | Albrecht ............... B05B 5/1616 222/1 |
| 2006/0115332 | A1 | * | 6/2006 | Abney .................... F16L 55/26 405/169 |
| 2009/0128136 | A1 | * | 5/2009 | Hablizel ............. B05B 12/1481 324/207.2 |
| 2014/0356079 | A1 | * | 12/2014 | Rusterholz ........... B65G 53/525 406/147 |

* cited by examiner

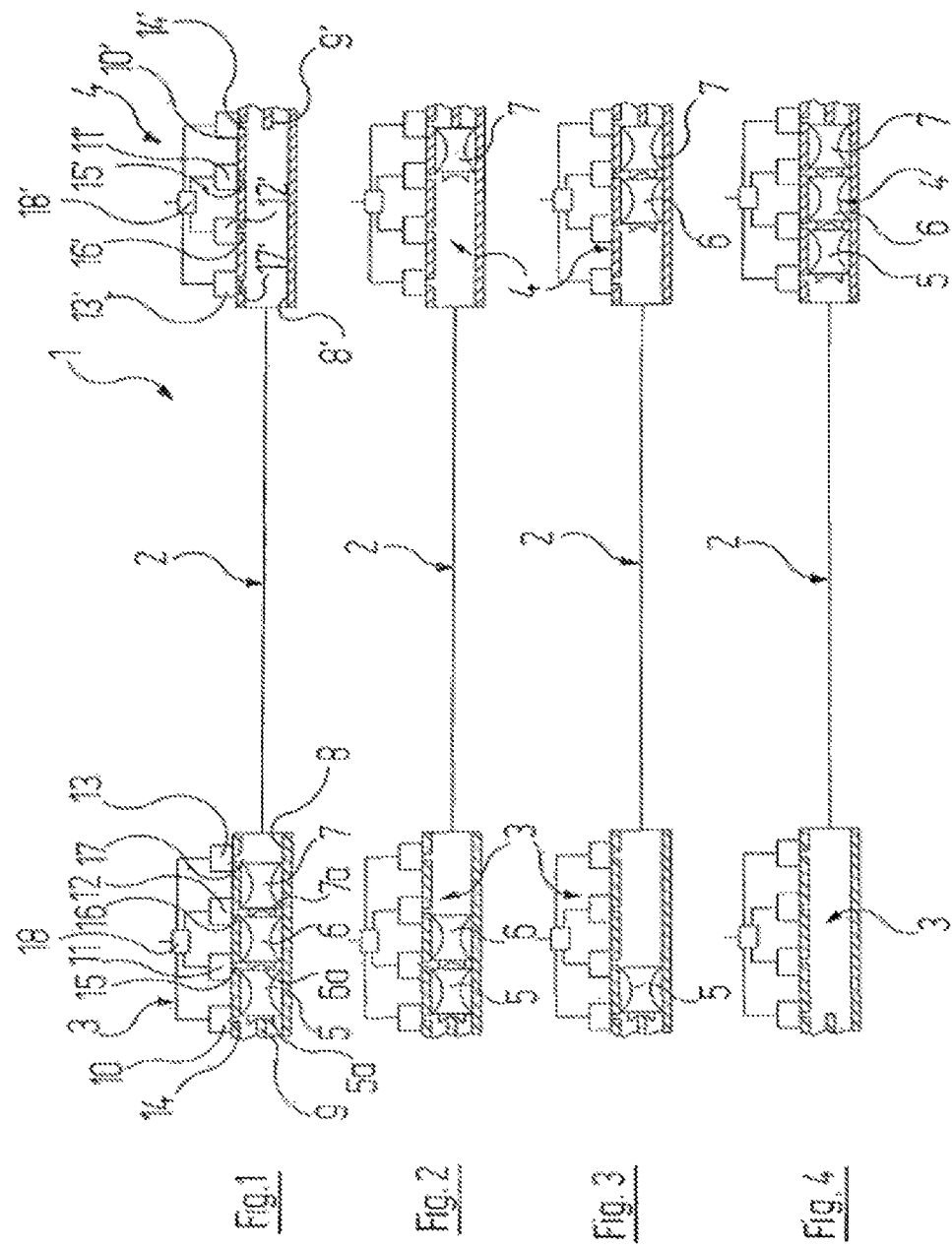

PIG SYSTEM

RELATED APPLICATIONS

This application is a national phase of International Patent Application No. PCT/EP2015/002017, filed Oct. 13, 2015, which claims the filing benefit of German Patent Application No. 10 2014 016 109.9, filed Oct. 30, 2014, the contents of both of which are incorporated herein by reference.

FIELD OF THE INVENTION

The invention relates to a pig system for transporting liquid or pasty substances, in particular paints, comprising
a) a first pig station, which possesses a pig channel which can receive a pig in a parking position, wherein to the parking position is assigned a controllable media connection, via which pushing medium can be introduced into the pig channel such that the pig is pushed out of the pig channel;
b) a second pig station, which likewise possesses a pig channel which can receive a pig in a parking position, wherein to the parking position is assigned a controllable media connection, via which pushing medium can be introduced into the pig channel such that the pig is pushed out of the pig channel;
c) a pig line, which connects the pig channel of one pig station to the pig channel of the other pig station.

BACKGROUND OF THE INVENTION

Pig systems for transporting liquid or pasty substances are widespread in the art, in particular in coating technology, where they are primarily used in supply units for application devices. There they are used, inter alia, for the transport of paint between paint-carrying loop lines of the spray booth and the application device.

Pigs are subject to natural wear and tear, so that, after a certain operating time, they become uptight and leaks occur along them. They must then be replaced. This should be able to be done in as short a time as possible and, if need be, also automatically, in order that costly downtimes of the plant are as far as possible avoided. In the pig system which is described in DE 10 2004 037 247 B4 and corresponds to the type stated in the introduction, there is provided a pig changing station, which is disposed outside of a pig station and contains a multiplicity of positions in which pigs, new or defective, can be stored. This external pig changing station is connected to the pig station by a line or a hose. Normally, the pig channel in this pig station is closed off by a stopper, against which the single pig moving in the actual pig system abuts. For the exchange of this pig, this stopper is removed by an appropriate mechanism and the hose leading to the pig changing station is connected up to the pig channel, so that now the defective pig is moved out and can be conveyed into a position of the pig changing station. A new, functional pig is thereupon introduced in the reverse direction into the pig channel of the pig station and the pig channel is closed off again by the stopper. In this way, a great number of pigs can be introduced into the pig system, which ensures very high service lives. However, this mechanism is very complicated and the times which are required for the pig change are not wholly insignificant.

SUMMARY OF THE INVENTION

An object of the present invention is to provide a pig system of the type stated in the introduction, with which a worn or otherwise defective pig can be replaced in very short time, and with low equipment expenditure, by another pig.

This object may be achieved according to the invention by virtue of the fact that
d) both pig stations have a plurality of parking positions in the pig channel, to which respectively an independently controllable media connection is assigned;
e) a plurality of pigs is provided in the pig system;
wherein
f) the media connections are controllable such that respectively only a part of the pigs moves between the pig stations, while the other pigs remain in their parking position.

According to the invention, a stock of pigs is kept not outside, but within the actual pig system. By suitable controlling of the media connections, it is managed only to keep respectively only a part of the functional pigs, preferably only one pig, active, so that these or this can oscillate between the two pig stations in fulfilling their/its transport function, while the other pigs, whether these now are worn or still new, remain in parking positions of the one or other pig station. This "exchanging" of the respectively active pigs or of the active pig can happen in an extremely short time, since only the switching times of the appropriate valves here play a role. The design cost here remains within very narrow limits, so that the pig system according to the invention is also extremely cheap. However, the number of pigs which can in this way be used in a pig system prior to an opening of the pig system is naturally limited.

In an advantageous embodiment of the invention, the pigs have on an end face a projection, such that, between the end faces of adjacent pigs in a pig channel, there remains an interspace into which a hole assigned to a media connection opens out. In this way, it can be precisely defined which pig is moved at which moment and which pigs remain stationary in their parking positions.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

An illustrative embodiment of the invention is explained in greater detail below on the basis of the drawing;
FIGS. 1 to 4 show a pig system in various operating states. FIG. 1 is here provided with complete reference symbols, while FIGS. 2 to 4, for reasons of clarity, contain only the most important reference symbols.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Reference is firstly made to FIG. 1, on the basis of which the main components of a pig system provided with the reference symbol 1 are described. This pig system 1 serves in a known manner to convey media through a pig line 2, which extends between two pig stations 3, 4. The conveyance of the medium happens with the aid of a plurality of, in the present case three, pigs 5, 6, 7, which in FIG. 1 are accommodated in a pig channel 8 of the left-hand pig station 3. This pig station 3 thus contains three parking positions for three pigs 5, 6, 7.

The shape of the pigs 5, 6, 7 is known per se: As the result of a waist narrowing, they acquire in both end regions a circumferential sealing lip; on an end face, in FIG. 1 the left-hand end face, the pigs 5, 6, 7 are provided with a projection 5a, 6a and 7a respectively. The projection 5a of the pig 5 disposed furthest left in FIG. 1 bears against a housing-fixed stop 9. In the drawing, the pig line 2, which can selectively be constituted by a rigid tube or else a flexible hose, is naturally represented only schematically, since it must have an inside diameter through which the pigs 5, 6, 7 can pass.

The pig station 3 is provided with a plurality of media connections 10, 11, 12, 13, of which the media connections 10, 11, 12 situated furthest left in the drawing are respectively assigned to a parking position of the pigs 5, 6, 7. The media connections 10, 11, 12, 13 contain shut-off valves, which can release or shut off the inflow of pressurized media through an associated opening 14, 15, 16, 17 in the housing of the pig station 3 into the pig channel 8. The openings 14, 15, 16 here open out into an interspace between the parked pigs 5, 6, 7 kept at a distance apart by their projections 5a, 6a, 7a.

The media connections 10, 11, 12 are connected to a media supply source 18 and can be fed by this with pushing medium. Which of the media connections 10, 11, 12 respectively releases the pushing medium stream, and which not, is determined by a control system (not represented) which is known per se, according to a logic which is explained in greater detail below.

The fourth media connection 13, which likewise comprises a controllable valve, opens out with its associated hole 17 into the pig channel 8 at a place which lies between the pig 7 disposed furthest right in FIG. 1 and the pig line 2. Via this media connection 13, the substance to be transported, for example paint, is added. To this end, it is likewise connected to the media supply source 18.

A further look shall now be taken at the, in FIG. 1, right-hand pig station 4. This possesses basically the same structure as the pig station 3; corresponding components are for the pig station 4 labeled with the same reference symbol, plus a'. However, in the operating state represented in FIG. 1, the right-hand pig station 4 is free from pigs 5, 6, 7.

The pig system 1 is operated in the following manner.

In the "new state" of the pig system 1, in which all pigs 5, 6, are undamaged and fully functional, the pig operation is performed solely of the pig 7, which in FIG. 1 is disposed in the left-hand pig station 3 and is closest to the pig line 2. After medium to be transported has been added into the line 2 via the media connection 13 in front of the pig 7, the media connection 12 is opened by the control system, so that pushing medium can penetrate into the interspace between the middle pig 6 and the right-hand pig 7.

As a result, the pig 7 is pushed out of the pig channel 8 and conveyed through the pig line 2 to the, in FIG. 1, right-hand pig station 4. The substance to be transported is hereupon pushed ahead of it, in the desired manner, and into the pig channel 8' of the second pig station 4. Via the opened media connection 10' thereof, the substance is removed from the pig station 4. The other media connections 11', 12' and 13' are here closed.

The end of the movement of the pig 7 takes place once this has reached that parking position of the right-hand pig station 4 in which it has arrived with its right-hand end face against the stop 9' within the pig channel 8'. By loading of the media connection 10' situated furthest right in FIG. 1 with pressure medium, the pig 7 can now be conveyed through the pig line 2 back into the, in FIG. 1, left-hand pig station 3, where it finds its end position through abutment of its projection 7a against the middle pig 6. Thus that position of the various pigs 5, 6, 7 which is represented in FIG. 1 is regained.

This operation of the pig system 1 is continued until such time as wear phenomena or other defects are manifested on the "active" pig 7, in general by the fact that the sealing lips of the pig 7 no longer bear tightly against the inner wall of the pig line 2 and so leaks can arise along the pig 7. In this case, hitherto in the prior art, the pig system 1 is opened and the pig 7 exchanged. In the present case, on the other hand, the pig 7, as represented in FIG. 2, is moved through the pig line 2 into the parking position, situated furthest right, in the right-hand pig station 4, where it bears against the stop 9'. It now remains in this position.

The transport of the medium through the pig line 2 is now taken over by the, in FIG. 1, middle pig 6, which now, however, is closest to the pig line 2 (cf. FIG. 2). This pig 6 oscillates, in further operation, between the middle parking position of the pig station 3 and the middle parking position of the pig station 4, wherein the connection 11 in the pig station 3 and the connection 11' in the pig station 4 are alternately subjected to pushing medium. The substance to be transported which is present in the pig station 3 can here further be added to via the media connection 13; the removal of the substance from the pig station 4 happens via the media connection 11'.

If, after a further operating time, the, in FIG. 1, middle pig too has become uptight or otherwise defective, it is also moved through the pig line 2 into the pig station 4, to be precise into the middle parking position there, where it now permanently remains. The active function in the transport of the medium through the pig line 2 is now taken over by the pig 5 lying furthest left in FIG. 1. By alternate loading of the media connection 10 in the left-hand pig station 3 and of the media connection 12' in the right-hand pig station 4, the pig 5 oscillates between the two pig stations 3 and 4 and in this way performs its transport function.

If the last pig 5, too, has reached the end of its life, it can still be moved for instance, as is shown in FIG. 4, into the right-hand pig station 4. All unusable pigs 5, 6, 7 are then removed and replaced by new pigs.

In the above description, it was assumed that the respectively active pig 5, 6, 7 pushes ahead of it the substance to be transported. However, an operation in which the substance is used as a pushing medium, i.e. drives forward the pig 5, 6, 7 through the pressure of the media supply source 18, is also conceivable. The pig 5, 6, 7 here cleans the pig line 2 of another substance still present therein.

In many cases, it is also conceivable that not only an active pig 5, 6, 7 is used. For instance, applications in which the transport of the substance between two pigs 5, 6, 7 is realized in the manner of a "parcel" are known in the prior art. The functionalization and defunctionalization of pigs 5, 6, 7 or pairs of pigs is here realized in appropriate application of the principles set out above.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

I claim:

1. A pig system for transporting liquid or pasty substances comprising:
   a) a first pig station which possesses a first pig channel which can receive a pig in a parking position, wherein the parking position is assigned a controllable media connection via which pushing medium can be introduced into the pig channel such that the pig is pushed out of the pig channel;
   b) a second pig station which possesses a second pig channel which can receive a pig in a second parking position, wherein to the second parking position is assigned a controllable media connection via which pushing medium can be introduced into the second pig channel such that the pig is pushed out of the second pig channel;
   c) a pig line which connects the first pig channel to the second pig channel;
   wherein
   d) both the first and second pig stations have a plurality of parking positions in the respective first and second pig channel, each parking position from the plurality of parking positions having an independently controllable media connection which supplies pushing medium to its parking position to move a pig from the parking position; and
   e) a plurality of pigs is provided in the pig system, each pig having an assigned parking position from the plurality of parking positions in each of the first and second pig stations;
   wherein
   f) the independently controllable media connections are controllable such that only a first portion of the plurality of pigs moves between the first and second pig stations when pushing medium is supplied by at least one of the independently controllable media connections, while a second portion of the plurality of pigs remain in their parking position.

2. The pig system as claimed in claim 1, wherein each of the plurality of pigs have on an end face a projection, such that, between the end faces of adjacent pigs in the first or second pig channel, there remains an interspace into which a hole assigned to a media connection opens out.

3. The pig system as claimed in claim 1 wherein at least in one of the first or second pig stations, the media connections are controllable such that, selectively via one of them, the liquid or pasty substance can be led out of the pig station.

4. The pig system as claimed in claim 1 wherein each of the independently controllable media connections are positioned between adjacent pigs from the plurality of pigs when the plurality of pigs are parked in their assigned parking positions.

* * * * *